(No Model.) 2 Sheets—Sheet 1.
N. W. STARR.
SLED RUNNER.
No. 300,156. Patented June 10, 1884.
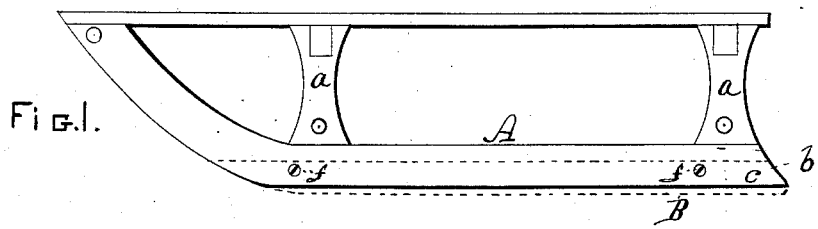
Fig.1.
Fig.2.
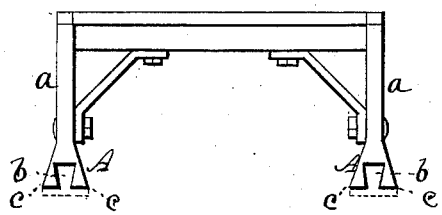
Fig.3.
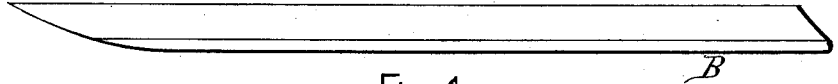
Fig.4.
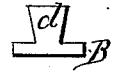
Fig.5.
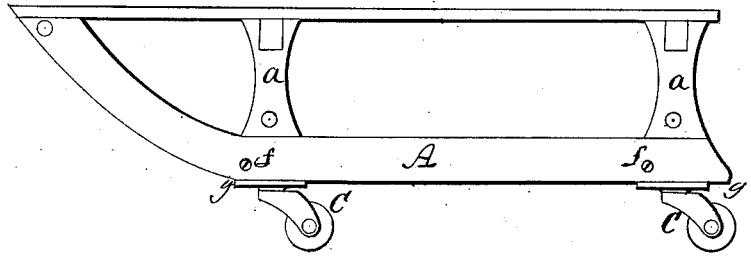
Fig.6. Fig.7.
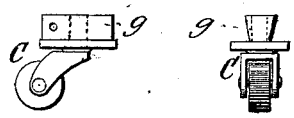
WITNESSES
N. A. Clark
A. S. Brown
INVENTOR
Nathaniel W. Starr
By his attorney,
J. S. Brown.

(No Model.)

N. W. STARR.
SLED RUNNER.

No. 300,156. Patented June 10, 1884.

WITNESSES,
W. E. Witherbee.
A. S. Brown

INVENTOR
Nathaniel W. Starr,
By J. S. Brown,
his Attorney.

UNITED STATES PATENT OFFICE.

NATHANIEL W. STARR, OF TARRYTOWN, NEW YORK.

SLED-RUNNER.

SPECIFICATION forming part of Letters Patent No. 300,156, dated June 10, 1884.

Application filed January 28, 1884. (No model.)

*To all whom it may concern:*

Be it known that I, NATHANIEL W. STARR, of Tarrytown, in the county of Westchester and State of New York, have invented an Improved Sled-Runner; and I do hereby declare that the following is a full and exact description thereof, reference being had to the accompanying drawings, making part of this specification—

Figure 8:
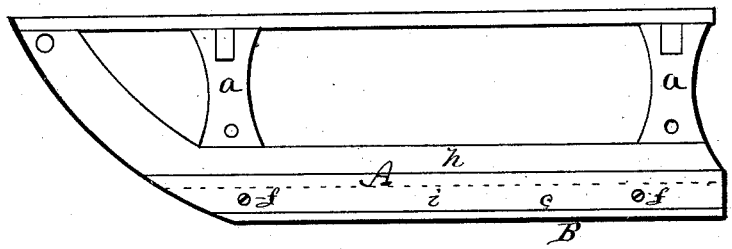
Figure 9:
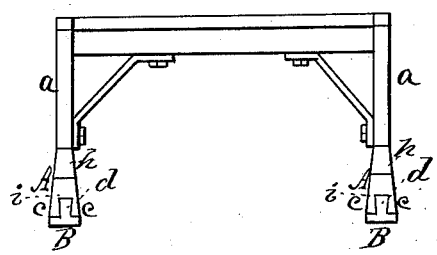

Figure 1 being a side view of a sled with my improved runners; Fig. 2, a rear view of the same; Fig. 3, a side view of a removable runner or shoe used with the main runner; Fig. 4, a rear end view of the same; Fig. 5, a side view of a sled having my improved runners provided with removable casters for use indoors and in the summer season; Figs. 6 and 7, views of a caster adapted to be applied to the sled-runners; Fig. 8, a side view of a sled provided with a modification of my improved runners; Fig. 9, a rear view of the same.

Like letters designate corresponding parts in all of the figures.

The runners A A of the sled I propose to make in various ways, according to preference or special use. Thus I may make the main runner of malleable cast-iron, or the runners proper of cast-iron and the standards *a a* of wrought-iron cast in or attached to the runners; or I may make the whole runner, including the standards, of wrought-iron or steel; or, as indicated in Figs. 8 and 9, I may make the principal body, *h*, of the runners of wood, with a malleable cast-iron or wrought-iron or steel permanently-attached shoe part *i;* or even the whole main runners may be made of some strong hard wood. When only the shoes *i* are of iron or steel, they may be attached to ordinary sled-runners by bolts, screws, or any suitable means.

In the lower edge of each main runner or shoe permanently attached to the runner, I make a longitudinal groove, *b*, as shown in Figs. 2 and 9, and indicated by dotted lines in Figs. 1 and 8. This groove serves two purposes—first, it divides the runner into two narrow runners or surfaces, *c c*, like skate-runners, which enable the runner to run better on ice and hard snow and better prevent lateral slipping; second, it adapts the runner to receive a removable wide runner or shoe, B, Figs. 3, 4, 8, 9, for use when the snow is soft or loose. I prefer to make this groove of dovetail form, as shown in Figs. 2 and 9, for the purpose of receiving a tongue, *d*, of the same form on the removable runner, as seen in Fig. 4.

The dotted lines in Figs. 1 and 2 show the position of the removable runner when it is applied in the groove of the main runner. The dovetail form of the tongue and groove is sufficient to hold the removable runner in place; but to prevent the pushing of the runner endwise out of position in using it, one or two pins or screws, *f f*, are inserted through the runner and tongue of the removable runner or shoe, as indicated in Fig. 1. The dovetail grooves *b b* in the runners also enable me to readily apply a set of removable casters or roller-wheels, C C, as shown in Fig. 5, for use in the house or on any other hard and sufficiently smooth surface or pavement in the summer time.

A caster constructed and adapted to be applied to the runners is shown in Figs. 6 and 7. A tongue, *g*, of dovetail form, is adapted to just fit and slide into the groove *b* of the runner; and to keep the casters in the proper positions in the runner-grooves the same pins or screws *f f* which are used to hold the removable runners in place may be used, going through holes *h* in the caster tongues or flanges.

I claim as my invention—

1. The combination of a sled-runner having two running-surfaces, *c c*, with a groove between them, and a detachable broad runner, B, adapted to fit in the groove and cover the said running-surfaces *c c*, substantially as and for the purpose herein specified.

2. The combination of a sled-runner provided with longitudinal groove *b* therein, and casters C C, provided with tongues or flanges fitting the grooves in the sled-runner, substantially as and for the purpose herein specified.

NATHANIEL W. STARR.

Witnesses:
J. BARCLAY BROWN, Jr.,
ARTHUR S. TOMPKINS.